E. HARWOOD.
TRACTION ENGINE WITH MEANS FOR PULLING ITSELF OUT OF A RUT.
APPLICATION FILED OCT. 31, 1916.
1,237,642.
Patented Aug. 21, 1917.
3 SHEETS—SHEET 1.
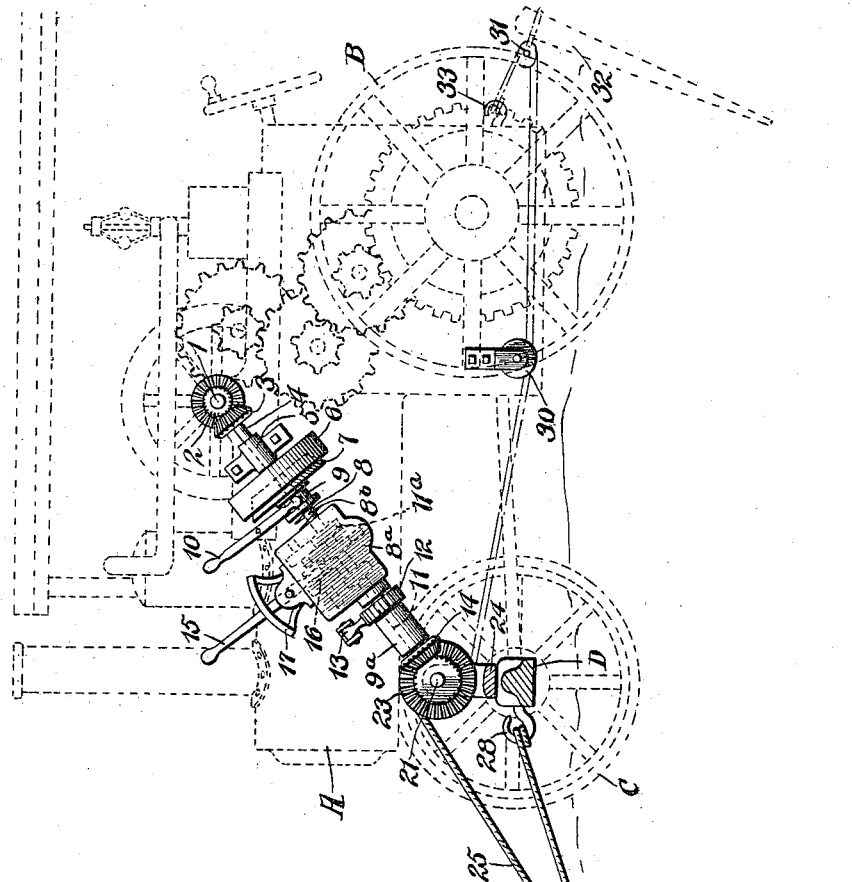
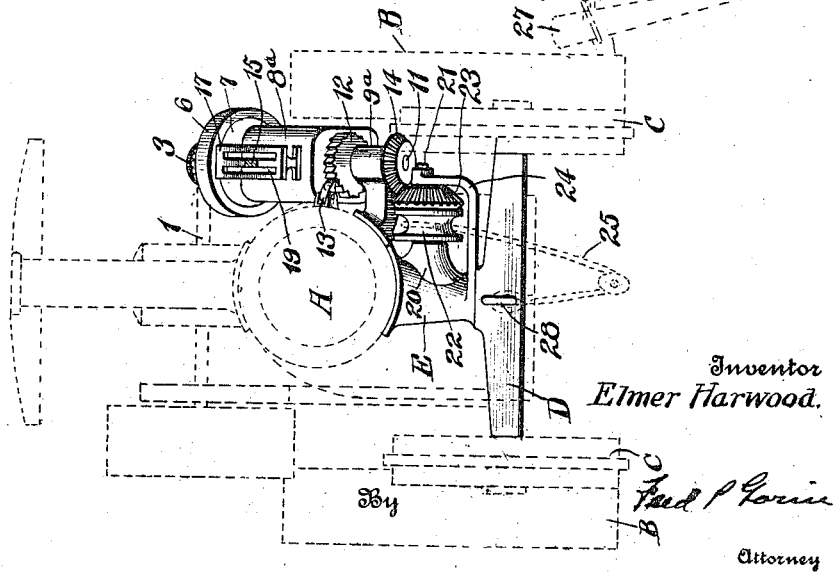
Inventor
Elmer Harwood.
By
Attorney E. HARWOOD.
TRACTION ENGINE WITH MEANS FOR PULLING ITSELF OUT OF A RUT.
APPLICATION FILED OCT. 31, 1916.
1,237,642.
Patented Aug. 21, 1917.
3 SHEETS—SHEET 2.
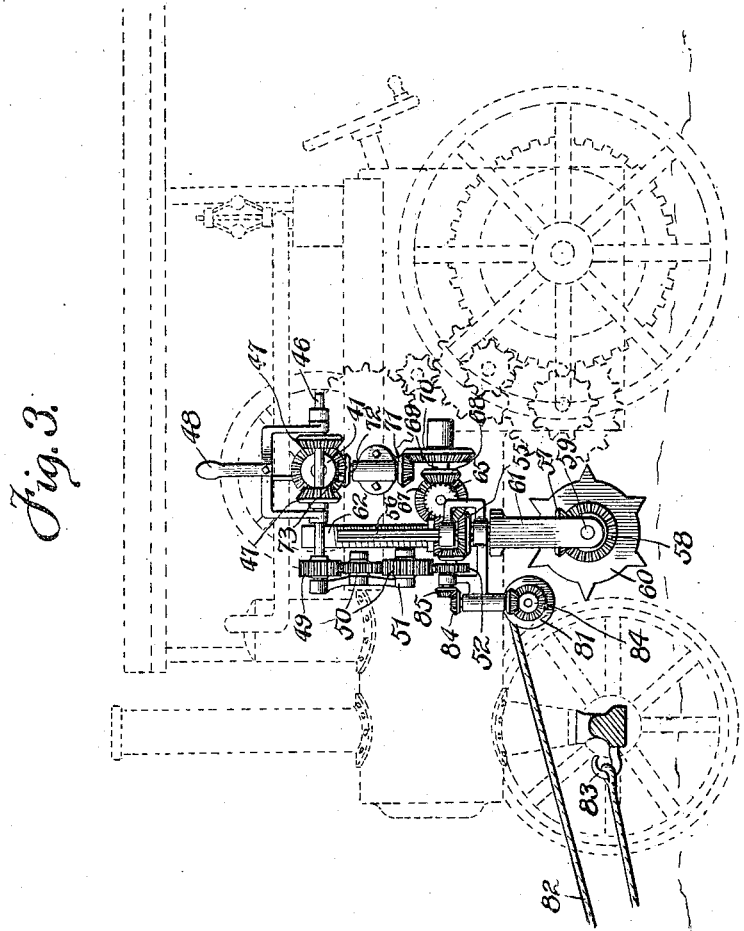
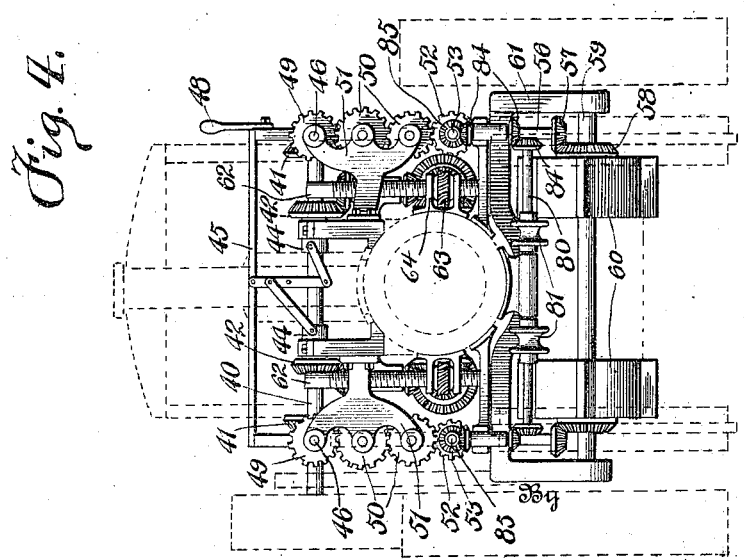
Inventor
Elmer Harwood
Attorney E. HARWOOD.
TRACTION ENGINE WITH MEANS FOR PULLING ITSELF OUT OF A RUT.
APPLICATION FILED OCT. 31, 1916.

1,237,642.

Patented Aug. 21, 1917.

Inventor
Elmer Harwood.

By Fred P. Gorrie

Attorney

UNITED STATES PATENT OFFICE.

ELMER HARWOOD, OF GOLD BASIN, WASHINGTON.

TRACTION-ENGINE WITH MEANS FOR PULLING ITSELF OUT OF A RUT.

1,237,642.     Specification of Letters Patent.     Patented Aug. 21, 1917.

Application filed October 31, 1916. Serial No. 128,763.

*To all whom it may concern:*

Be it known that I, ELMER HARWOOD, a citizen of the United States, and a resident of Gold Basin, Washington, in the county of King, have invented certain new and useful Improvements in Traction - Engines with Means for Pulling Themselves Out of Ruts, of which the following is a full, true, and exact specification.

The invention relates to improvements in means for pulling a traction engine from the mud by its own power.

The object of the invention is to provide mechanism for causing the traction engine to move faster than same would travel under its own power through the ordinary gearing for the purpose of packing the clay or mud opposite the wheels of the traction engine that the latter may obtain traction when the wheels are rotated by the power of the engine.

A further object of the invention is to provide means for pulling the engine faster than it could ordinarily travel under its own power, and means for increasing or decreasing the speed of such mechanism independently of the speed imparted by the engine in the ordinary travel of the machine.

The invention also comprehends improvements in the details of construction and arrangement of parts which will be hereinafter described and particularly pointed out in the claims.

In the accompanying drawings:—

Figure 1 illustrates conventionally an elevation of a traction engine with the invention applied thereto.

Fig. 2 is a front elevation of the same, the traction engine being indicated in dotted lines.

Fig. 3 is a view similar to Fig. 1, but illustrating another form of the invention.

Fig. 4 is an end view of the same.

Figure 5:
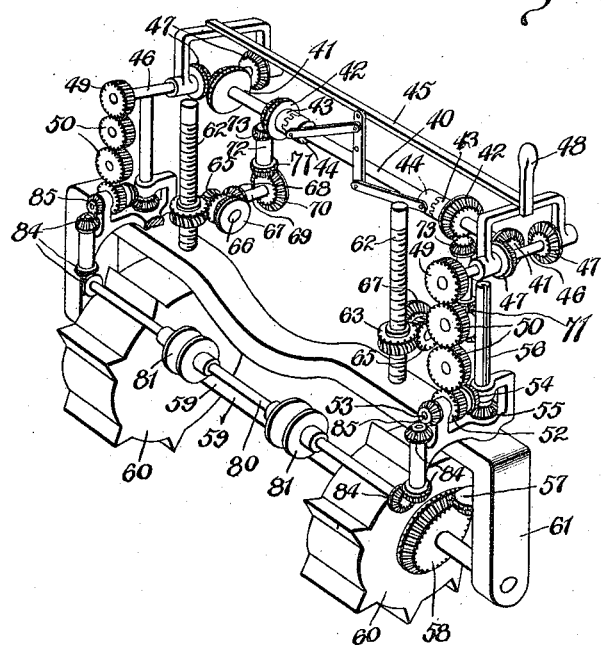
Fig. 5 is a detached perspective view of the invention as illustrated in Figs. 3 and 4.

Two forms of the invention are illustrated, but in both the fundamental principle is involved, and each will be separately described.

Referring to Figs. 1 and 2, A indicates an ordinary traction engine, B the traction wheels, C the front wheels, D the axle thereof, and E the standard between the axle and the boiler.

1 indicates the usual power shaft operated from the engine ordinarily employed in machines of this type. Secured on the shaft 1, is a beveled pinion 2, and meshing with the beveled pinion is a similar beveled pinion 3, mounted on a short shaft 4, supported in bearings 5, suitably connected to the frame of the traction engine. On the shaft 4 is fastened a fly wheel 6, one face thereof forming a clutch member into which a clutch member 7 fits. The clutch member 7 is provided with a grooved collar 9, mounted on a short shaft 8, supported in a transmission casing 8$^a$. Between the collar 9 and the transmission casing is a spring 8$^b$, to normally hold the clutch sections together, and fitting in the groove of the collar 9 is a lever 10, to control the movement of the member 7.

Mounted in the transmission casing 8$^a$, and a suitable bearing 9$^a$, extending from the traction engine, is a shaft 11, provided with suitable gears 11$^a$, in the transmission casing and a ratchet wheel 12, engaged by a pawl 13, and at the lower end of the shaft 11, is a beveled pinion 14.

Mounted on the transmission casing is a lever 15, the lower end of which is suitably connected to gears 16, in the transmission casing. The lever 15 extends through a casting 17, provided with the usual H-path 19, ordinarily employed in transmission shifting mechanism. The gearing in the transmission box is not shown in detail, as it may be of any well known construction, however for the purpose of this invention, instead of shifting the gears from neutral to low speed, the gears are first shifted to high speed, and the speed may be reduced by manipulating the lever to throw in the low gear for a purpose to be described.

Extending from the standard E, is a bearing 20, in which is mounted a short horizontal shaft 21, and mounted thereon is a drum 22, and a beveled pinion 23, the latter meshing with a beveled pinion 14. A shaft 21 is further mounted in a bearing 24, also extending from the standard E.

A cable 25 is attached to the drum 22, and passes over a sheave 26, supported on a post 27, driven into the ground. From the sheave 26, the cable is extended to engage a hook 28, attached to the front axle of the traction machine.

In operation the post 27 is driven into the ground a suitable distance from the traction engine, and where the same is stuck in the mud; and the levers 10 and 15 are manipulated to take up the slack in the cable 25, before power from the shaft 1 is imparted to the traction wheels B. The slack having been taken up, the clutch is momentarily disconnected, and the lever 15 is operated to throw the high speed mechanism into gear. At the same time the power shaft is connected through the usual mechanism with the traction wheels B, consequently there are two forces working on the traction wheels. One force, that due to the rotation of the drum through the cable pulling at the machine bodily in a forward direction, and secondly, the other force which is the rotation of the traction wheels B. The speed of the gearing on the machine is such that it will draw the machine bodily forward at a greater rate of speed than the motion imparted through the rotation of the traction wheels B. The result is with the forward thrust of the periphery of the traction wheels against the mud in which the machine is stuck serves to pack the mud in advance of the wheels, and affords a traction surface therefor when the traction wheels are rotated in the ordinary operation of the machine. The result is, assuming the clay is soft and traction cannot be had, the mud becomes packed and forms a hard surface, which enables the wheels to obtain a grip, and therefore the machine is moved forward out of the rut.

The purpose of drawing the machine forwardly at its greatest rate of speed at the beginning of the operation is to cause the wheels to thrust against the soft mud to pack the same for the beginning of the tractive movement of the wheels B. When the mud is so packed and traction can be had, the gears are shifted and a lower speed is imparted, consequently power is obtained through the drum and cable to coöperate with the tractive influence of the wheels B to pull the machine in a forward direction and out of the rut. As there are several gears and speeds contemplated by the mechanism shown, it is evident that after the preliminary advancement of the machine is over, the said gears can be shifted according to the conditions of the mud or the road over which the machine is traveling.

In case it be desired to move the machine in a backward direction, the cable 25 is extended rearwardly, and under a sheave 30 attached to the frame, and is then passed over a sheave 31, attached to a post 32, and is then extended to a hook or the like 33, on the rear of the engine.

In the form of the invention shown in Figs. 3 to 5, a somewhat different construction is disclosed, and in addition thereto tractors are employed for assisting in the movement of the engine when same is stuck in a rut.

On a power shaft 40 are beveled pinions 41. In addition to these beveled pinions 41 other beveled pinions 42 are loosely mounted on the shaft, each of which is provided with a clutch member 43, and coöperating with said clutch members are clutch members 44, which are simultaneously controlled by a system of levers 45.

The mechanism about to be described is similar on both sides of the traction engine, consequently but one of said mechanisms will be described in detail.

46 indicates a horizontal shaft, and mounted to slide thereon but rotate therewith are two beveled pinions 47, designed to mesh at different times with pinion 41. One or the other of these gears is brought into mesh with pinion 41, by shifting the lever 48.

On one end of shaft 46 is a pinion 49, which meshes with a train of gears 50, mounted on shafts supported in a bracket 51. The last of the train of gears 50 meshes with a pinion 52, on a shaft 53. On one end of this shaft is a beveled pinion 54, which meshes with a beveled pinion 55, mounted on a shaft 56. The shaft is splined to allow same to slide through beveled pinion 55, and at its lower end it is provided with a beveled pinion 57, which meshes with a beveled pinion 58, on shaft 59. The shaft 59 extends across the under part of the traction engine and is provided with two tractors 60, and is mounted in a yoke 61, which is designed to be moved up and down to carry the tractors into and out of engagement with the ground. Through each side of the yoke adjacent the boiler of the traction engine extends a screw 62, which extends through a threaded opening in a worm wheel 63, supported in suitable bearings 64. Meshing with the worm wheel 63 is a worm 65, mounted on a short shaft 66, on which is also mounted a beveled pinion 67. Meshing with the wheel 67 is a bevel pinion 68, mounted on a short shaft 69, and on the opposite end of this shaft is a beveled pinion 70. Meshing with the beveled pinion 70 is a beveled pinion 71, mounted on a short shaft 72, and at the upper end thereof is a beveled pinion 73, which meshes with one of the beveled pinions 42.

Extending across the under side of the boiler in rear of the front wheels of the traction engine is a shaft 80, and mounted thereon are two drums 81, around which cables 82 are passed, same passing over sheaves secured to posts, as before described, and extending to hooks 83, on the front axle of the traction engine. The shaft 80 is rotated through beveled pinions 84, which mesh with a pinion 85, on the shaft 53.

In operation the levers 45 are operated to engage the clutch members 44 with the clutch member 43, which rotates the gears 73, etc., and worm 65, which rotates the worm gearing 63—65. Rotation of the worm wheel 63, through the instrumentality of the threaded screws 62, lowers the yoke 61 to bring the tractors 60 into contact with the ground. Then the handle 48 is operated to simultaneously shift the gears 47 on opposite sides of the machine, which through the gearing operates shaft 53, causing rotation of the shaft 80, and shafts 56, and consequent rotation of the tractors 60.

It will be understood that when the tractors 60 and the drums 81 are operated, the lever 45 is under control of the attendant, so that downward pressure of the tractors and the earth can be regulated so as to make proper traction with the earth to cause forward movement of the engine. It is also to be understood that the gearing for rotating the shaft 80 will be so arranged as to cause the machine to travel faster than the movement imparted by the traction wheels when power is applied for rotating said wheels, and during the time the shaft 80 is rotated and the traction wheels are rotated, the tractors 60 are constantly engaging the ground to advance the machine and pull same out of the rut.

The mechanism described not only causes the periphery of the traction wheels to impact with the ground, but it also enables the tractors 60 to likewise impact with the earth, with the result that traction is obtained for the advancement of the machine. If the traction is not sufficient, then of course the tractors are lowered further into the ground so as to take a greater bite on the earth, which causes the machine to move forwardly.

If it be desired to move the machine in a rearward direction the cables will be directed under the machine and attached to the rear thereof in substantially the same manner described in connection with the preferred form of the invention.

What is claimed is:—

1. In combination, a power driven vehicle including an engine, power shaft, traction wheels and gearing between the engine and traction wheels, a drum on the vehicle, gearing between the drum and the power shaft, means for reversing the gearing, a support located beyond the vehicle, a sheave on the support, a cable passed around the drum and the sheave and secured at its opposite end to the vehicle, the gearing causing the drum to pull on the cable and draw the vehicle at a greater rate of speed than the speed imparted by the traction wheels to pack the earth for the said wheels to obtain traction with said earth.

2. In combination, a power driven vehicle including an engine, a power shaft, traction wheels, and gearing between the engine and traction wheels, a drum, a support located beyond the vehicle, a sheave on the support, a cable passed around the drum and sheave and fastened to the vehicle, gearing operated from the power shaft to rotate the drum at a speed which will pull the vehicle at a greater rate of speed than that imparted by the traction wheels, and means for reversing the movement of the drum independently of the speed of the traction wheels.

3. In combination, a power driven vehicle including an engine, power shaft, traction wheels, and gearing between the engine and traction wheels, a drum on the vehicle, gearing between the drum and the power shaft, means for reversing the gearing, a support located beyond the vehicle, a sheave on the support, a cable passed around the drum and the sheave and secured at its opposite end to the vehicle, a pair of tractors, a frame carrying the tractors, gearing for rotating the tractors, and gearing operated by the engine for raising and lowering the tractors.

4. In combination, a power driven vehicle including an engine, power shaft, traction wheels, and gearing between the engine and traction wheels, a drum on the vehicle, gearing between the drum and the power shaft, means for reversing the gearing, a support located beyond the vehicle, a sheave on the support, a cable passed around the drum and the sheave and secured at its opposite end to the vehicle, a pair of tractors, a frame carrying the tractors, gearing for rotating the tractors, means for raising and lowering the frame including screw shafts and gearing, the latter being operated by the power shaft.

5. In combination, a power driven vehicle including an engine and power shaft, a pair of vertically movable tractors, a frame in which the tractors are supported, gearing operated from the power shaft to raise and lower the frame, means for controlling the latter gearing, a drum on the vehicle, gearing operated by the power shaft for simultaneously rotating the drum and the tractors, a reversing gear, means for controlling the reversing gear and the gearing which operates the drum and the tractors, a cable passed around the drum, a block located beyond the vehicle and around which the cable is passed, the opposite end of the cable being attached to the vehicle.

6. In combination, a power driven vehicle including an engine and power shaft, a pair of tractors, a frame in which the tractors are mounted, vertical screws extending from the frame, a nut engaging each screw, said nuts having teeth on their peripheries, gearing between the nuts and the power shaft for operating the frame, a drum shaft, drums mounted thereon, gearing between the drum shaft and the power shaft for rotating the drum, means for reversing the rotary motion of the drums, and cables wound around the drum and extending therefrom.

ELMER HARWOOD.

Copies of this patent may be obtained for five cents each, by addressing the "Commissioner of Patents, Washington, D. C."